3,746,713
S-(1 - METHYL - 2 - OXO-4-THIOPYRIMIDINYL-3-METHYL)-O,O-DIMETHYLPHOSPHOROTHIOATE
Martin L. Gorbaty, Fanwood, N.J., assignor to Esso Research & Engineering Co., Linden, N.J.
No Drawing. Filed June 29, 1971, Ser. No. 158,099
Int. Cl. C07d 51/38
U.S. Cl. 260—251 P         1 Claim

ABSTRACT OF THE DISCLOSURE

S-[1-methyl-2-oxo - 4 - thiopyrimidinyl-3-methyl]-O,O-dimethylphosphorothioate as a biologically active compound of exceptional pesticidal activity.

---

This invention relates to novel substituted thiouracils. In one aspect, this invention relates to novel derivatives of 1-substituted thiouracils. In another aspect, this invention relates to the use of novel phosphoric and thiophosphoric acid ester derivatives of 1-substituted thiouracils as pesticides.

It is an object of the present invention to provide new thiophosphoric and phosphoric acid derivatives of substituted thiouracils which possess improved pesticidal activity.

It is another object of the subject invention to provide a novel pesticidal use for said compounds.

Other objects and many of the attended advantages of this invention will be readily appreciated as the same becomes better understood by reference to the following detailed description. The compounds within the scope of this invention are characterized by the following structural formulae:

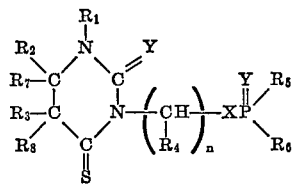

and

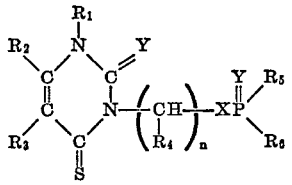

In these formulae, $R_1$ is an organic radical, $R_2$, $R_3$, $R_7$ and $R_8$ can be the same or different and are hydrogen, $C_1$–$C_6$ alkyl, $C_1$–$C_6$ haloalkyl, hydroxyalkyl, thioalkyl, halo, aryl, thioaryl, alkoxyalkyl, alkyl and dialkylamino including cyclic secondary amino, cyano, carboalkoxyl, $C_1$–$C_6$ alkenyl and alkynyl, alkylthioalkyl; $R_2$ and $R_3$ can be joined to form rings of 5–6 members, which may or may not be aromatic, $R_4$ can be hydrogen, $C_1$–$C_4$ alkyl and halo substituted derivatives thereof, $C_2$–$C_6$ alkenyl and alkynyl; $R_5$ and $R_6$ can be the same or different and are $C_1$–$C_6$ alkyl, $C_1$–$C_6$ alkoxyl, $C_1$–$C_6$ alkylthio, $C_6$–$C_{10}$ aryloxyl, $C_1$–$C_6$ haloalkyl, $C_6$–$C_{10}$ aryl, $C_6$–$C_{10}$ halosubstituted aryl, $C_7$ to $C_{11}$ arylalkyl and $C_7$ to $C_{11}$ halosubstituted arylalkyl; and $n$ is an integer of from 1 to 2; X and Y are O or S.

In the above formula, the organic radical $R_1$ can be any suitable organic radical. The term organic radical includes dialkylamino, alkyl sulfonyl, alkoxy, arylamino, aliphatic, aryl, cycloaliphatic, aromatic, heterocyclic radicals and substituted derivatives. The organic radicals may be substituted with any substituent which does not interfere with pesticidal activity of the compound and can be for example, halogen such as for example, chloro, bromo, iodo, fluoro and the like; nitro, alkoxy such as, for example, methoxy, ethoxy, propoxy, butoxy, and the like; carboalkoxy, such as for example, carbomethoxy, carboethoxy, and the like; dialkyl amino, such as for example, dimethylamino, diethylamino, dipropylamino, methylethylamino, piperidino, morpholino, and the like; mercaptoalkyl; hydroxy and the like.

When aliphatic radicals are the organic radicals in the above formulae, they may be, for example, alkyl, alkenyl, alkynyl, aralkyl, and/or aralkenyl, cycloalkylalkyl.

Any suitable alkyl radical may be the organic radical such as, for example, lower alkyls, $C_1$–$C_6$ isomers thereof, such as for example, 2-methylbutyl, 2-methylpentyl, 1,2-dimethylpropyl, 2,2-dimethylpropyl, 3-methylpentyl and the like, and the corresponding straight chain and branch chain isomers of $C_6$ to $C_{12}$ alkyls, $C_3$–$C_7$ cycloalkyl substituted alkyl, such as for example, cyclopropylmethyl, cyclopropylethyl, cyclopentylmethyl.

Any suitable alkenyl or alkynyl radical may be the organic radical such as, for example, ethenyl, 1-propenyl, 2-propenyl, isopropenyl, 1-butenyl, 2-butenyl, 3-butenyl and the corresponding branched chain isomers thereof such as, for example, 1-isobutenyl, 2-isobutenyl, 2-secondary-butenyl and 2-pentenyl, 3-pentenyl, ethynyl and propynyl.

Any suitable aralkyl radical may be the organic radical such as, for example, benzyl, phenylethyl and phenylpropyl.

Any suitable aralkenyl radical may be the organic radical such as, for example, phenylethenyl, phenyl-1-propenyl, β-phenyl-isopropenyl and phenyl derivatives of the isomers of butenyl, pentenyl and hexenyl.

Any suitable cycloalkyl radical may be the organic radical such as, for example, cyclopropyl, cyclobutyl, cycloamyl and cyclohexyl.

Any suitable cycloalkenyl radical may be the organic radical such as, for example, cyclopentenyl and cyclohexenyl.

Any suitable aryl radical may be the organic radical such as, for example, phenyl and substituted phenyl.

Any suitable alkaryl radical may be the organic radical such as, for example, isomeric tolyl and xylyl.

The specific examples of the novel compounds are as follows:

S-[1-methyl-2-oxo-4-thiopyrimidinyl-3-methyl]-O,O-diethylphosphorothioate;

S-[1-ethyl-2-oxo-4-thiopyrimidinyl-3-methyl]-O-ethyl-S-n-propylphosphorodithioate;

S-[1-methyl-2-oxo-4-thiopyrimidinyl-3-methyl]-O,O-dimethylphosphorothioate;

S-[1-(2-chloroethyl)-2-oxo-5-carboethoxy-4-thiopyrimidinyl-3-methyl]-O-butyl-S-propylphosphoro dithioate;

S-[1-methyl-2-oxo-4-thiopyrimidinyl-3-methyl]-O-ethyl-ethylphosphonodithioate;

S-[1-isopropyl-2-oxo-4-thiopyrimidinyl-3-(2-chloroethyl)]-O,O-dimethylphosphorothioate;

S-[1-(2-methoxyethyl)-2-oxo-5-ethyl-4-thiopyrimidinyl-3-methyl]-O-ethyl-S-phenyl phosphorodithioate;

S-[1-(2-diethylaminoethyl)-2-oxo-5-ethyl-4-thiopyrimidinyl-3-methyl]-O,O-dimethyl phosphorothioate;

S-[1-methyl-2-oxo-5-phenyl-4-thiopyrimidinyl-3-(1-propyl)]-O-(p-chlorophenyl)-S-isopropyl phosphorodithioate;

S-[1-phenyl-2-(1H)-oxo-5,6,7,8-tetrahydro-4-(3H)-thioquinazolinyl-3-methyl]-O,O-dipropyl phosphorothioate;

S-[1,5-dimethyl-2-oxo-4-thiopyrimidinyl-3-methyl]-O-ethyl-p-chlorophenyl phosphonothioate;

S-[1-methyl-2-thio-4-oxo-5,6-dihydropyrimidinyl-3-methyl]-O,O-dimethyl phosphorothioate;
S-[1-ethyl-2-thio-4-oxo-5,6-dihydropyrimidinyl-3-methyl]-O-ethyl-S-n-propylphosphorodithioate;
S-[1-methyl-2-thio-4-oxo-5,6-dihydropyrimidinyl-3-methyl]-O-ethyl propylphosphonodithioate.

The compounds falling within the scope of this invention can be prepared by the following procedural steps. Schematically the process can be represented as follows:

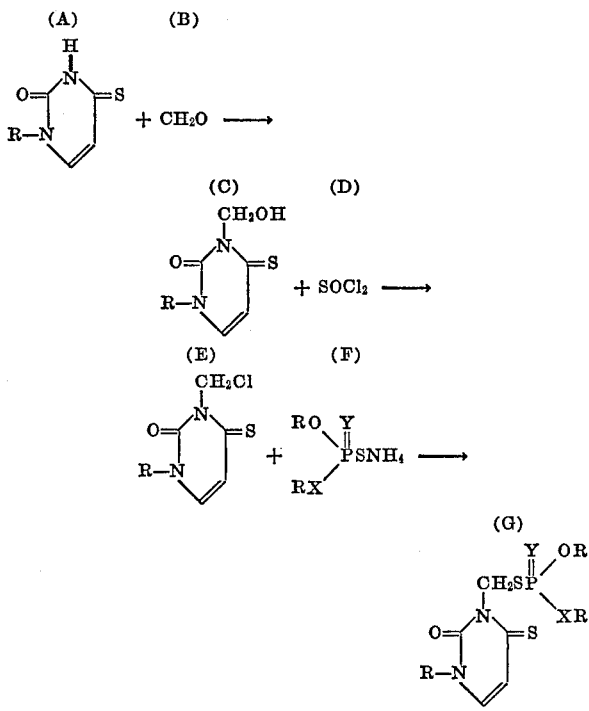

The starting thiouracils (A) may be prepared by direct thiation of the uracil as described by J. J. Fox et al. J. Am. Chem. Soc. 81, 178 (1959). Alternatively, a more versatile method involving ring closure is described by R. W. Lamon, in J. Heterocyclic Chem., 5, 837 (1968); ibid, 6, 261 (1969). The starting thiodihydrouracils may be prepared by the method of C. C. Cheng and L. R. Lewis, J. Heterocyclic Chem., 1, 260 (1964).

| React-ants | Tempera-ture, °C. | Molar ratio | Pressure | Solvents |
|---|---|---|---|---|
| A+B | 0 to 250 | 1:1 to 1:20 | Atm. to 50 atm. | Water, methanol, ethanol, isopropanol, methyl, cyanide, tetrahydrofuran, dimethylsulfoxide. |
| | 25 to 100 | 1:4 | Atm. | Dimethylsulfoxide. |
| C+D [1] | −40 to 100 | 1:1 to 1:5 | Atm. to 10 atm. | Methylene chloride, chloroform. |
| E+F | 0 to 100 | 1:1 to 1:5 | Atm. to 10 atm. | Acetonitrile, tetrahydrofuran, ethanol, methanol. |
| | 25 to 100 | 1:1.1 | Atm. | Acetonitrile. |

[1] In place of D, other halogenating agents such as phosphorus trichloride, phosphorus tribromide, phosphorus pentachloride, etc. can also be used.

The following examples are illustrative of this invention and demonstrate the utility of the new compounds prepared in accordance with this invention.

EXAMPLE 1

Preparation of 1-methyl-3-chloromethyl-4-thiouracil

A solution of 8.8 g. (0.062 mol) of 1-methyl-4-thiouracil in 100 ml. of dimethylsulfoxide was treated with 20 g. (0.25 mol) of 37% aqueous formaldehyde and the mixture heated to 80° for 3 hrs. The solvent was removed in vacuo, the residue taken up in chloroform, washed with water and dried (MgSO$_4$). The solvent was removed in vacuo to afford 11.1 g. of crude hydroxymethylated material. A solution of 10 g. (0.058 mol) of the latter in 250 ml. of chloroform was treated with 8.4 ml. (0.116 mol) of thionyl chloride, heated to reflux for 12 hrs. and the solvent removed in vacuo. The residue was placed under high vacuum for 2 hrs. to afford 6.2 g. (56%) of an oil whose infrared and n.mr. spectra confirmed the structure.

EXAMPLE 2

Preparation of S-(1-methyl-2-oxo-4-thiopyrimidinyl-3-methyl)-O,O-dimethylphosphorothioate A solution of 6.20 g. (0.033 mol) of 1-methyl-3-chloromethyl-4-thiouracil in 250 ml. of acetonitrile was treated with 5.65 g. (0.036 mol) of ammonium O,O-dimethylphosphorothioate. The mixture was stirred for one hour at ambient temperature then heated to reflux for 2 hours. It was then filtered and the solvent removed in vacuo. The residue was taken up in 200 ml. of chloroform, washed with water and dried (MgSO$_4$). The solvent was removed in vacuo and the residue placed under high vaccum for 0.5 hr. to afford 6.3 g. (65%) of a viscous orange oil. Infrared and n.mr. spectra confirmed the structure.

As previously noted, the thiouracil phosphate esters of this invention are useful as pesticides, particularly as insecticides. When used as an insecticide, the biologically active thiouracil phosphate esters are preferably formulated with a suitable carrier or diluent or combinations thereof.

The term "carrier" or "diluent" as used herein means a material, which can be inorganic or organic and synthetic or of natural origin, with which the active thiouracil phosphate esters are mixed, or formulated to facilitate its storage, transport, and handling and application to the insects to be treated. The carrier is preferably biologically and chemically inert and, as used, can be a solid or fluid. When solid carriers are used, they are preferably particulate, granular, or pelleted however, other shapes and sizes of solid carrier can be employed as well. Such preferable solid carriers can be natural occurring minerals—although subsequently subjected to grinding, sieving, purification, and/or other treatments—including, for example, gypsum, tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the thiouracil phosphate esters.

For some purposes, a resinous or waxy carrier can be used, preferably one which is solvent soluble or thermoplastic, including fusible. Examples of such suitable natural or synthetic resins such as a coumarone resin, rosin, copal, shellac, dammar, polyvinyl chloride, styrene-polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be horticultural petroleum spray oils boiling in the range of from about 275° to about 575° F., or boiling in the range of about 575° to about 1000° F.

and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active thiouracil phosphate esters ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active thiouracil phosphate esters ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the thiouracil phosphate esters mixed with a dispersing, i.e., deflocculating or suspending agent, and if desired, a finely divided solid carrier and/or a wetting agent. The thiouracil phosphate esters can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used, if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active thiouracil phosphate esters ingredient incorporated therein are also included in this invention. These can be prepared by impregnating a granular carrier with a solution of the thiouracil phosphate esters or by granulating a mixture of a finely divided solid carrier and the active thiouracil phosphate esters. The carrier used can consist of or contain a fertilizer or fertilizer mixture, as for example, a superphosphate.

The compositions of this invention can also be formulated as solutions of the active thiouracil phosphate esters ingredient in an organic solvent or mixture of solvents, such as for example alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active thiouracil phosphate esters in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active thiouracil phosphate esters are preferably in a nonaqueous phase.

GENERAL EXPERIMENTAL PROCEDURES FOR BIOLOGICAL TESTING

In the examples which follow, the new thiouracil phosphate esters were treated in the greenhouse and in the laboratory to determine their biological activity.

The experimental compounds were tested as aqueous emulsions. These emulsions were prepared by dissolving the compound in acetone and dispersing it in distilled water with Triton X–100, an alkylaryl polyether alcohol derived by the reaction of i-octyl phenol with ethylene oxide, to give spray emulsions containing the desired concentration of the compound. These emulsions were then used in standard laboratory tests described below.

Mexican bean beetle

Bean leaves were dipped in the emulsion of the test chemical and allowed to dry. The individual treated leaves were placed in Petri dishes and five Mexican bean beetle larvae introduced into each of the two replicate dishes.

Mites, contact.—Potted bean plants infested with the two-spotted spider mites were placed on a turntable and sprayed with a formulation of the test chemical. The plants were held for seven days and the degree of mite control was rated after this period.

Mites, systemic.—Bean plants were treated by applying 20 ml. of the formulated test chemical to the soil. The mites were transferred to the plants after 24 hours. The plants were held for seven more days and the degree of mite control rated.

Aphid, contact.—Potted nasturtium plants infested with the bean aphids were placed on a turntable and sprayed with a formulation of the test chemical. The plants were held for two days and the degree of aphid control was rated.

Aphid, systemic.—Nasturtium plants were treated by applying 20 ml. of the formulated test chemical to the soil. The mites were transferred to the plants after 24 hours. The plants were held for 48 additional hours and the degree of the Aphid control rated.

Boll weevil.—Five mixed sex adult boll weevils placed in a wire screen cage were sprayed with the proper concentration of formulated test chemical. The boll weevils were provided with sucrose solution on a filter paper. The cages were held at about 70° F. for 24 hours and the percent mortality read after 24 hours.

Some of the selected compounds of this class were also tested against Southern army worm, other insects of aphids and Coleoptera family, and against resistant mites and were found to be active.

Biological activity 4-thiouracil-N-methylenephosphates are potent, contact and systemic, broad spectrum insecticides. Data for the O,O-dimethylphosphorothioate derivative demonstrate the point.

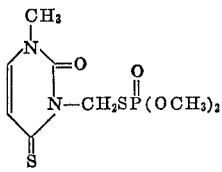

TABLE I

Approximate LD$_{50}$ (p.p.m.)

| Mexican bean bettle | | Southern army worm | Mites | | | | Aphid | | Pea aphid | | Resistant mite | | | | Toxicology, acute, oral |
|---|---|---|---|---|---|---|---|---|---|---|---|---|---|---|---|
| | | | Contact | | Systemic | | | | | | Contact | | Systemic | | |
| Contact | Systemic | | Adult | Nymph | Adult | Nymph | Contact | Systemic | Contact | Systemic | Adult | Nymph | Adult | Nymph | |
| 0.63 | 3 | (¹) | 10 | (¹) | 4 | 15 | 15 | 10 | 40 | 5 | 80 | (¹) | 80 | 240 | 6.8 mg./kg. |

¹ >250 p.p.m.

What is claimed is:
1. The compound S-[1-methyl-2-oxo-4-thiopyrimidinyl-3-methyl]-O,O-dimethylphosphorothioate.

References Cited

UNITED STATES PATENTS 3,216,894  11/1965  Lorenz et al. _____ 167—22

ALEX MAZEL, Primary Examiner

R. V. RUSH, Assistant Examiner

U.S. Cl. X.R.

260—251 R, 256.4 C, 256.5 R; 424—251